United States Patent
Zhou et al.

(10) Patent No.: US 10,423,501 B2
(45) Date of Patent: Sep. 24, 2019

(54) METADATA RECOVERY METHOD AND APPARATUS

(71) Applicant: Huawei Technologies Co., Ltd., Shenzhen (CN)

(72) Inventors: Zhao Zhou, Chengdu (CN); Tian Zhang, Chengdu (CN); Wei Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 15/605,501

(22) Filed: May 25, 2017

(65) Prior Publication Data
US 2017/0262351 A1 Sep. 14, 2017

Related U.S. Application Data

(63) Continuation of application No. PCT/CN2014/092384, filed on Nov. 27, 2014.

(51) Int. Cl.
| | |
|---|---|
| *G06F 11/14* | (2006.01) |
| *G06F 16/14* | (2019.01) |
| *G06F 16/185* | (2019.01) |
| *G06F 12/16* | (2006.01) |

(52) U.S. Cl.
CPC .......... *G06F 11/1471* (2013.01); *G06F 12/16* (2013.01); *G06F 16/14* (2019.01); *G06F 16/185* (2019.01); *G06F 2201/80* (2013.01); *G06F 2201/805* (2013.01); *G06F 2201/82* (2013.01)

(58) Field of Classification Search
CPC combination set(s) only.
See application file for complete search history.

(56) References Cited

U.S. PATENT DOCUMENTS

| | | | |
|---|---|---|---|
| 5,717,921 A * | 2/1998 | Lomet | G06F 17/30327 |
| 5,794,242 A | 8/1998 | Green et al. | |
| 5,806,065 A * | 9/1998 | Lomet | G06F 17/30327 |
| | | | 707/610 |

(Continued)

FOREIGN PATENT DOCUMENTS

| | | |
|---|---|---|
| CN | 100377154 C | 3/2008 |
| CN | 101763321 A | 6/2010 |

(Continued)

*Primary Examiner* — Amine Riad
(74) *Attorney, Agent, or Firm* — Leydig, Voit & Mayer, Ltd.

(57) ABSTRACT

The present disclosure discloses a metadata recovery method and apparatus, the method includes: searching for a target node, where the target node has been damaged or index information recorded in the target node has been lost; and recovering the index information in the target node according to index information recorded in a related node, where the related node includes a parent node and a child node that are of the target node and an adjacent node belonging to a same layer as the node, and the index information includes brother index information pointing to the adjacent node belonging to the same layer as the node, parent index information pointing to the parent node of the node, and child index information pointing to the child node of the node. The present disclosure is mainly applied to a process of virtual data recovery.

6 Claims, 14 Drawing Sheets

(56) References Cited

U.S. PATENT DOCUMENTS

| | | | | |
|---|---|---|---|---|
| 6,192,376 | B1* | 2/2001 | Kincaid | G06F 11/1435 |
| | | | | 707/696 |
| 6,631,385 | B2* | 10/2003 | Lee | G06F 11/1474 |
| 6,792,432 | B1* | 9/2004 | Kodavalla | G06F 17/30348 |
| 7,028,022 | B1* | 4/2006 | Lightstone | G06F 17/30336 |
| 7,287,033 | B2* | 10/2007 | Shadmon | G06F 17/3061 |
| 7,440,977 | B2 | 10/2008 | Bae et al. | |
| 7,577,865 | B2* | 8/2009 | Nguyen | G06F 11/0727 |
| | | | | 709/213 |
| 7,843,871 | B2* | 11/2010 | Jagana | H04W 76/19 |
| | | | | 370/328 |
| 8,346,824 | B1* | 1/2013 | Lyle | G06F 17/30206 |
| | | | | 707/822 |
| 2003/0130981 | A1 | 7/2003 | Nehru et al. | |
| 2012/0036394 | A1* | 2/2012 | Feng | G06F 11/1662 |
| | | | | 714/4.12 |
| 2012/0226776 | A1* | 9/2012 | Keebler | G06F 17/30578 |
| | | | | 709/217 |
| 2012/0324285 | A1 | 12/2012 | Li et al. | |
| 2013/0007506 | A1* | 1/2013 | Jain | G06F 11/1484 |
| | | | | 714/4.12 |
| 2013/0232152 | A1* | 9/2013 | Dhuse | G06F 17/30321 |
| | | | | 707/741 |
| 2016/0034508 | A1* | 2/2016 | Aron | G06F 17/30327 |
| | | | | 707/626 |

FOREIGN PATENT DOCUMENTS

| | | |
|---|---|---|
| CN | 103049354 A | 4/2013 |
| CN | 103744961 A | 4/2014 |
| GB | 2311392 A | 9/1997 |

* cited by examiner

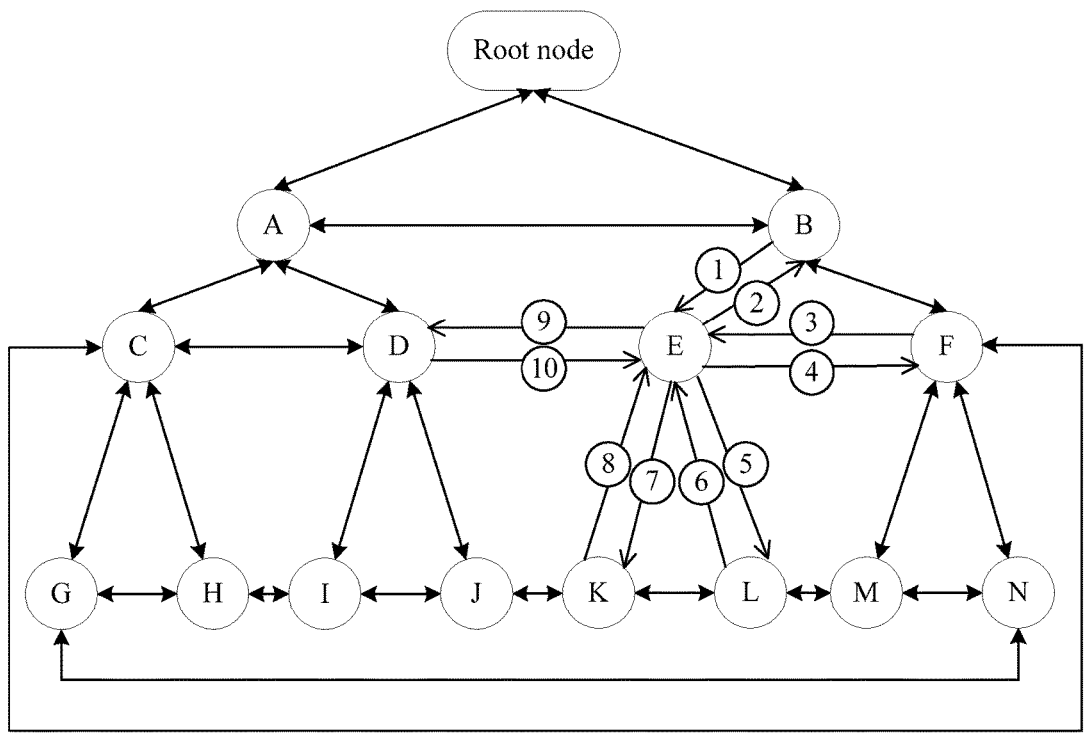

FIG. 8

```
┌─────────────────────────────────────────────────────┐
│ Find, according to home information of each node   │     301
│ in a target tree when each node is a target node,  │
│ a home node that belongs to the target tree        │
└─────────────────────────────────────────────────────┘
                          │
                          ▼
┌─────────────────────────────────────────────────────┐
│ Recover an intermediate node and a data node that  │     302
│ are of the target tree according to the found home │
│ node                                                │
└─────────────────────────────────────────────────────┘
```

FIG. 9

METADATA RECOVERY METHOD AND APPARATUS

CROSS-REFERENCE TO RELATED APPLICATION

This application is a continuation of International Application No. PCT/CN2014/092384, filed on Nov. 27, 2014, the disclosure of which is hereby incorporated by reference in its entirety.

TECHNICAL FIELD

The present disclosure relates to the field of data storage, and in particular, to a metadata recovery method and apparatus.

BACKGROUND

Currently, a virtual system can provide a user with contiguous logical space for data storage, and the logical space is also referred to as a logical unit number (LUN). A relationship of mapping a data block from logical space to actual physical space is recorded in metadata. FIG. 1 shows a virtualized storage structure. Metadata may be stored in a form of a binary tree or a multi-way tree. The metadata includes one root node and multiple intermediate nodes. The root points, by using intermediate nodes, to intermediate nodes at tail ends of branches (also referred to as leaves). Each leaf corresponds to one data node, and the data nodes may be located in different physical devices. All the data nodes form a piece of virtual data, and a length of a data node is in direct proportion to a size of storage space occupied by the data node.

However, if the metadata is damaged, the root is disconnected from the data nodes, resulting in a failure in reading the virtual data. In the prior art, to overcome the foregoing problem, as shown in FIG. 2, all currently used metadata (a primary file) is backed up to obtain a backup file (a secondary file) of the primary file. When the primary file is damaged, the virtual data is successfully read by using the secondary file.

In the foregoing process of implementing metadata recovery, the prior art has at least the following problem: When both the primary file and the secondary file are damaged, the root is disconnected from the data nodes, resulting in a failure in reading the virtual data.

SUMMARY

The present disclosure provides a metadata recovery method and apparatus, which can resolve a problem that virtual data reading fails when both a primary file and a secondary file are damaged.

According to a first aspect, the present disclosure provides a metadata recovery method, including:

searching for a target node, where the target node has been damaged or index information recorded in the target node has been lost; and recovering the index information in the target node according to index information recorded in a related node, where the related node includes a parent node and a child node that are of the target node and an adjacent node belonging to a same layer as the node, and the index information includes brother index information pointing to the adjacent node belonging to the same layer as the node, parent index information pointing to the parent node of the node, and child index information pointing to the child node of the node.

With reference to the first aspect, in a first possible implementation manner of the first aspect, the recovering the index information in the target node according to index information recorded in a related node specifically includes:

generating a blank temporary node if the target node has been damaged, where the temporary node is configured to replace the target node;

establishing a correspondence between the temporary node and the parent node of the target node according to child index information that points to the target node and that is recorded in the parent node of the target node;

establishing, according to other child index information recorded in the parent node of the target node, a correspondence between the temporary node and an adjacent brother node belonging to a same layer as the temporary node, where the other child index information is child index information in the parent node except the child index information pointing to the target node;

searching for a lower-layer node of the target node, where the lower-layer node is an adjacent brother node belonging to a same layer as the child node of the target node;

determining the child node of the target node according to brother index information recorded in the lower-layer node, and establishing a correspondence between the temporary node and the child node of the target node; and replacing the target node with the temporary node.

With reference to the first aspect or the first possible implementation manner of the first aspect, a second possible implementation manner of the first aspect is further provided, in the second possible implementation manner of the first aspect, the recovering the index information in the target node according to index information recorded in a related node specifically includes:

if the index information recorded in the target node has been lost, establishing a correspondence between the target node and the parent node of the target node according to child index information that points to the target node and that is recorded in the parent node of the target node;

establishing, according to other child index information recorded in the parent node of the target node, a correspondence between the target node and an adjacent brother node belonging to the same layer as the target node, where the other child index information is child index information in the parent node except the child index information pointing to the target node;

searching for a lower-layer node of the target node, where the lower-layer node is an adjacent brother node belonging to a same layer as the child node of the target node; and determining the child node of the target node according to brother index information recorded in the lower-layer node, and establishing a correspondence between the target node and the child node of the target node.

With reference to the first aspect, the first possible implementation manner of the first aspect or the second possible implementation manner of the first aspect, a third possible implementation manner of the first aspect is further provided, in the third possible implementation manner of the first aspect, the index information further includes home information, and the home information is used to describe a tree to which a node belongs; and the method further includes:

finding, according to home information of each node in a target tree when each node is the target node, a home node that belongs to the target tree; and recovering an intermediate node and a data node that are of the target tree according to the found home node.

With reference to the first aspect, the first possible implementation manner of the first aspect, the second possible implementation manner of the first aspect, or the third possible implementation manner of the first aspect, a fourth possible implementation manner of the first aspect is further provided, in the fourth possible implementation manner of the first aspect, the method further includes:

adding the index information to each node when each node is generated.

According to a second aspect, the present disclosure further provides a metadata recovery method, where the method includes:

searching for a target node, where the target node has been damaged or index information recorded in the target node has been lost; and recovering the index information in the target node according to index information recorded in an array corresponding to a layer at which a related node is located, where the related node includes a parent node and a child node that are of the target node and an adjacent node belonging to a same layer as the node, and the array is used to record adjacency of nodes at one layer in sequence.

According to a third aspect, the present disclosure further provides a metadata recovery apparatus, including:

a search unit, configured to search for a target node in nodes stored by a storage unit, where the target node has been damaged or index information recorded in the target node has been lost; and a recovery unit, configured to recover, according to index information recorded in a related node stored by the storage unit, the index information in the target node found by the search unit, where the related node includes a parent node and a child node that are of the target node and an adjacent node belonging to a same layer as the node, and the index information includes brother index information pointing to the adjacent node belonging to the same layer as the node, parent index information pointing to the parent node of the node, and child index information pointing to the child node of the node.

With reference to the third aspect, in a first possible implementation manner of the third aspect, the recovery unit specifically includes:

a temporary node generation subunit, configured to: when the target node has been damaged, generate a blank temporary node, where the temporary node is configured to replace the target node;

a first parent node association subunit, configured to establish a correspondence between the temporary node and the parent node of the target node according to child index information that points to the target node and that is recorded in the parent node of the target node found by the search unit;

a first brother node association subunit, configured to establish, according to other child index information recorded in the parent node of the target node found by the search unit, a correspondence between the temporary node and an adjacent brother node belonging to a same layer as the temporary node, where the other child index information is child index information in the parent node except the child index information pointing to the target node;

a first lower-layer node search subunit, configured to search for a lower-layer node of the target node found by the search unit, where the lower-layer node is an adjacent brother node belonging to a same layer as the child node of the target node;

a first child node association subunit, configured to: determine the child node of the target node according to brother index information recorded in the lower-layer node found by the lower-layer node search subunit, and establish a correspondence between the temporary node and the child node of the target node; and a replacement subunit, configured to replace the target node with the temporary node.

With reference to the third aspect, in the third aspect or the first possible implementation manner of the third aspect, a second possible implementation manner of the third aspect is further provided, in the second possible implementation manner of the third aspect, the recovery unit further includes:

a second parent node association subunit, configured to: when the index information recorded in the target node found by the search unit has been lost, establish a correspondence between the target node and the parent node of the target node according to child index information that points to the target node and that is recorded in the parent node of the target node;

a second brother node association subunit, configured to establish, according to other child index information recorded in the parent node of the target node found by the search unit, a correspondence between the target node and an adjacent brother node belonging to the same layer as the target node, where the other child index information is child index information in the parent node except the child index information pointing to the target node;

a second lower-layer node search subunit, configured to search for a lower-layer node of the target node, where the lower-layer node is an adjacent brother node belonging to a same layer as the child node of the target node; and a second child node association subunit, configured to: determine the child node of the target node according to brother index information recorded in the lower-layer node found by the second lower-layer node search subunit, and establish a correspondence between the target node and the child node of the target node.

With reference to the third aspect, in the third aspect or the first or the second possible implementation manner of the third aspect, a third possible implementation manner of the third aspect is further provided, in the third possible implementation manner of the third aspect, the index information further includes home information, and the home information is used to describe a tree to which a node belongs;

the apparatus further includes:

a home-node search unit, configured to find, according to home information of each node in a target tree when each node is the target node, a home node that belongs to the target tree; and the recovery unit is further configured to recover an intermediate node and a data node that are of the target tree according to the home node found by the home-node search unit.

With reference to the third aspect, in the third aspect or the first, the second, or the third possible implementation manner of the third aspect, a fourth possible implementation manner of the third aspect is further provided, in the fourth possible implementation manner of the third aspect, an addition unit is specifically configured to:

add index information to each node when each node is generated.

According to a fourth aspect, the present disclosure further provides a metadata recovery apparatus, including:

a search unit, configured to search for a target node in nodes stored by a storage unit, where the target node has been damaged or index information recorded in the target node has been lost; and a recovery unit, configured to recover the index information in the target node according to index information recorded in an array corresponding to a layer at which a related node is located, where the related node includes a parent node and a child node that are of the target node and an adjacent node belonging to a same layer as the node, and the array is used to record adjacency of nodes at one layer in sequence.

According to a fifth aspect, the present disclosure further provides a metadata recovery apparatus, including:

a processor, configured to: search for a target node in nodes stored by a memory, where the target node has been damaged or index information recorded in the target node has been lost; and recover the index information in the target node according to index information recorded in a related node stored by the memory, where the related node includes a parent node and a child node that are of the target node and an adjacent node belonging to a same layer as the node, and the index information includes brother index information pointing to the adjacent node belonging to the same layer as the node, parent index information pointing to the parent node of the node, and child index information pointing to the child node of the node.

With reference to the fifth aspect, in a first possible implementation manner of the fifth aspect, the processor is specifically configured to:

generate a blank temporary node if the target node has been damaged, where the temporary node is configured to replace the target node;

establish a correspondence between the temporary node and the parent node of the target node according to child index information that points to the target node and that is recorded in the parent node of the target node;

establish, according to other child index information recorded in the parent node of the target node, a correspondence between the temporary node and an adjacent brother node belonging to a same layer as the temporary node, where the other child index information is child index information in the parent node except the child index information pointing to the target node;

search for a lower-layer node of the target node, where the lower-layer node is an adjacent brother node belonging to a same layer as the child node of the target node;

determine the child node of the target node according to brother index information recorded in the lower-layer node, and establish a correspondence between the temporary node and the child node of the target node; and replace the target node with the temporary node.

With reference to the fifth aspect, in the fifth aspect or the first possible implementation manner of the fifth aspect, a second possible implementation manner of the fifth aspect is further provided, in the second possible implementation manner of the fifth aspect, the processor is specifically configured to:

if the index information recorded in the target node has been lost, establish a correspondence between the target node and the parent node of the target node according to child index information that points to the target node and that is recorded in the parent node of the target node;

establish, according to other child index information recorded in the parent node of the target node, a correspondence between the target node and an adjacent brother node belonging to the same layer as the target node, where the other child index information is child index information in the parent node except the child index information pointing to the target node;

search for a lower-layer node of the target node, where the lower-layer node is an adjacent brother node belonging to a same layer as the child node of the target node; and determine the child node of the target node according to brother index information recorded in the lower-layer node, and establish a correspondence between the target node and the child node of the target node.

With reference to the fifth aspect, in the fifth aspect or the first or the second possible implementation manner of the fifth aspect, a third possible implementation manner of the fifth aspect is further provided, in the third possible implementation manner of the fifth aspect, the index information further includes home information, and the home information is used to describe a tree to which a node belongs; and the processor is further configured to:

find, according to home information of each node in a target tree when each node is the target node, a home node that belongs to the target tree; and recover an intermediate node and a data node that are of the target tree according to the found home node.

With reference to the fifth aspect, in the fifth aspect or the first, the second, or the third possible implementation manner of the fifth aspect, a fourth possible implementation manner of the fifth aspect is further provided, in the fourth possible implementation manner of the fifth aspect, the processor is further configured to add index information to each node when each node is generated.

According to a sixth aspect, the present disclosure further provides a metadata recovery apparatus, where the apparatus includes a processor, configured to: search for a target node in nodes stored by a memory, where the target node has been damaged or index information recorded in the target node has been lost; and recover the index information in the target node according to index information recorded in an array corresponding to a layer at which a related node is located, where the related node includes a parent node and a child node that are of the target node and an adjacent node belonging to a same layer as the node, and the array is used to record adjacency of nodes at one layer in sequence.

According to the metadata recovery method and apparatus provided in the present disclosure, during recovery of a target node, index information in the target node is recovered by using index information recorded in a related node, thereby recovering a connection between a root and a data node. In the prior art, merely backup is performed, and no index information is recorded in nodes. Therefore, when a node is damaged, the damaged node cannot be recovered unless a backup is used for replacement. In the present disclosure, because index information pointing to a brother node, a parent node, and a child node that are of a node is added to the node, when the target node is damaged, the index information in the target node can be recovered by using index information that is recorded in a parent node, a child node, and a brother (or cousin) node that are of the target node, thereby restoring a connection between a root and each data node and ensuring successful reading of virtual data.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following descriptions show merely some embodiments of the present disclosure, and a person of ordinary skill in the art may still derive other drawings from these accompanying drawings without creative efforts.

FIG. 8 is another schematic structural diagram of metadata according to an embodiment of the present disclosure;

FIG. 9 is a flowchart 3 of a metadata recovery method according to an embodiment of the present disclosure;

DESCRIPTION OF EMBODIMENTS

Currently, only index information pointing to a child node is set in a root and an intermediate node that are of metadata, that is, unidirectional indexing is used. Therefore, when a link from the root to a data node is disconnected because a node in unidirectional indexing is damaged, the damaged node cannot be repaired in the prior art, resulting in a failure in reading virtual data. In the present disclosure, to overcome a problem that a damaged node cannot be recovered in unidirectional indexing, the following solutions are provided to recover any damaged node.

Figure 1:
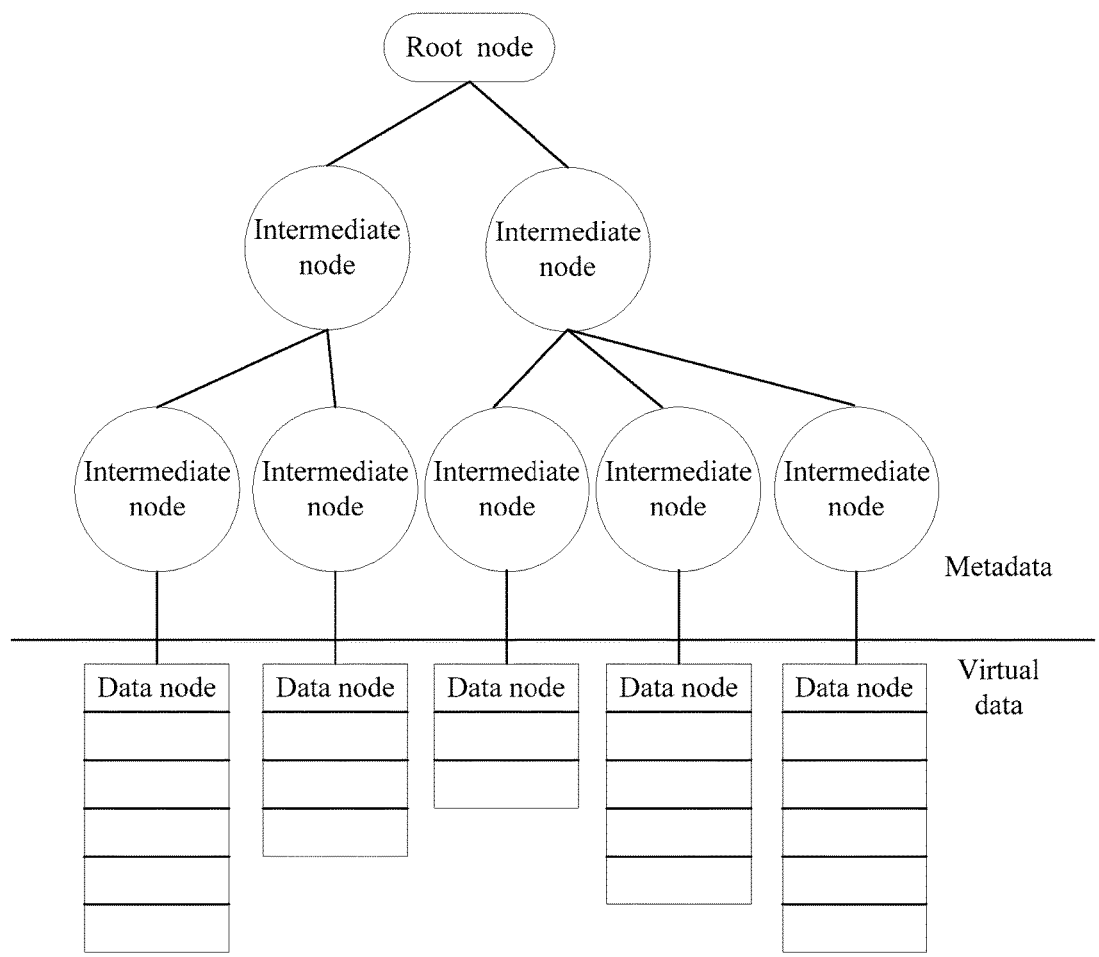
FIG. 1 is a schematic diagram of a virtualized storage structure in the prior art.
Figure 2:
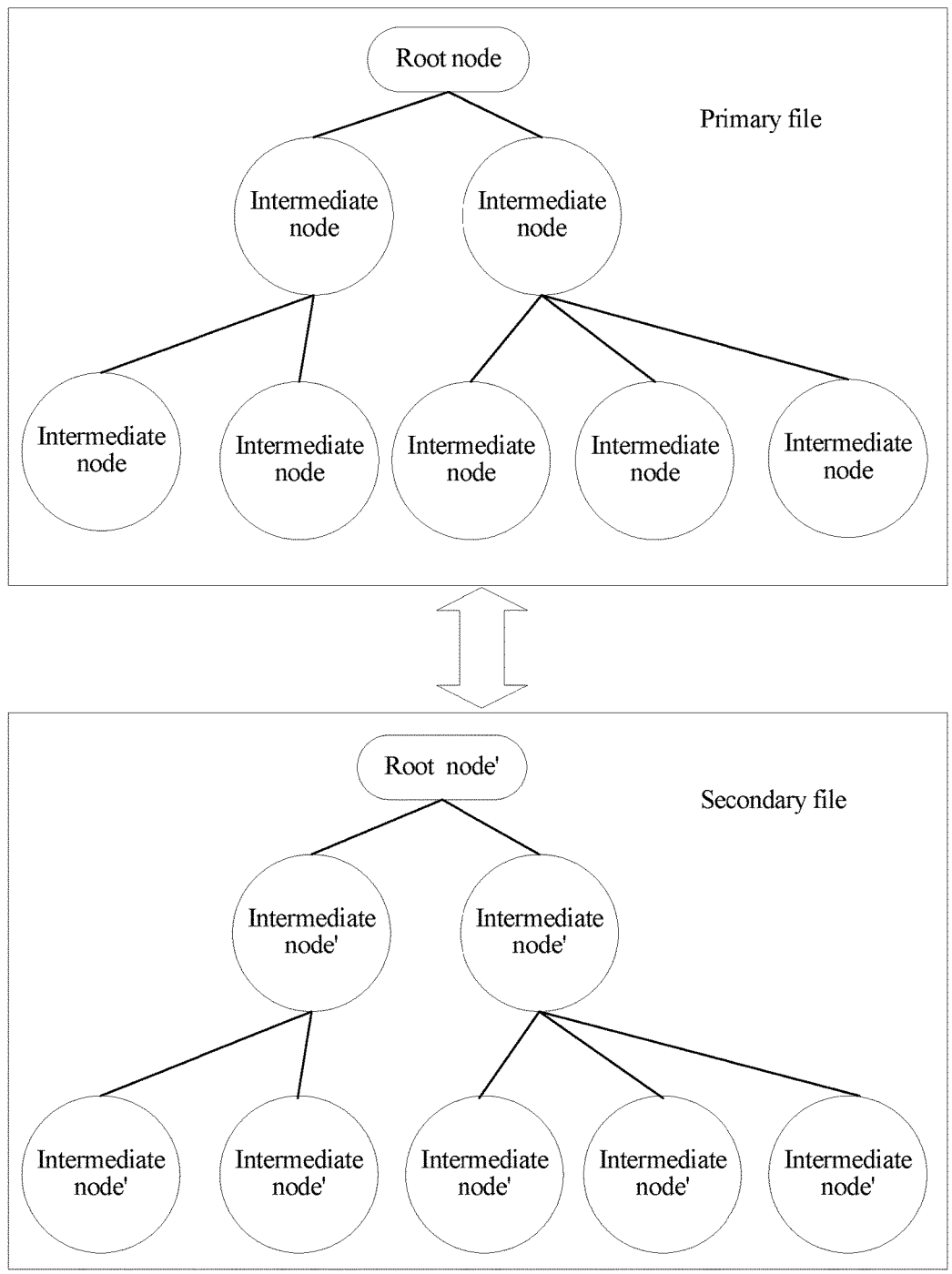
FIG. 2 is a schematic diagram of backing up virtual data in the prior art.
Figure 3:
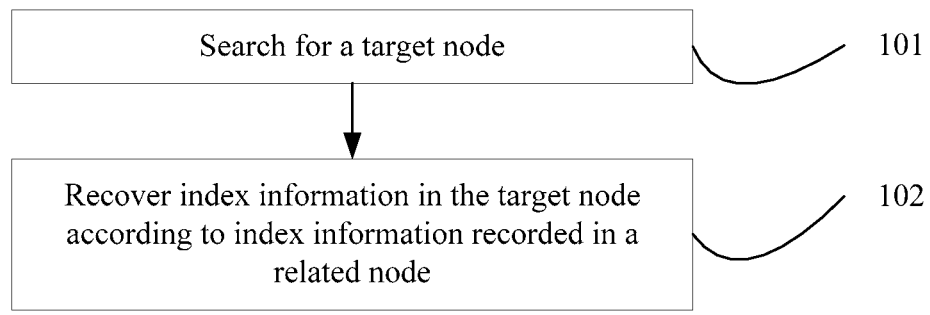
FIG. 3 is a flowchart 1 of a metadata recovery method according to an embodiment of the present disclosure.

An embodiment of the present disclosure provides a metadata recovery method. The method is applied to a storage virtualization system, where the virtualization system may be a distributed system, or may be a centralized system. The method may be further applied to management of a redundant array of independent disks (RAID). As shown in FIG. 3, the method includes:

Step 101: Search for a target node.

The target node has been damaged or index information recorded in the target node has been lost. That the target node has been damaged indicates that another node cannot access the target node, resulting in a failure in accessing the target node. For a specific definition of damage, no particular limitation is imposed in the present disclosure because a failure in reading data caused by any reason can be considered as having been damaged. That index information recorded in the target node has been lost indicates that the target node can be accessed, but all or some of the index information recorded in the target node has been lost.

Before step 101, the method further includes: adding index information to each node.

The node includes a root node, an intermediate node, and a data node, the index information includes brother index information pointing to an adjacent node belonging to a same layer as the node, parent index information pointing to a parent node of the node, and child index information pointing to a child node of the node. The nodes of metadata are configured to record index information, and the index information is used to record a tree structure of the metadata, so as to arrive at data nodes that are in a one-to-one correspondence to leaf nodes. All the data nodes form to-be-read data.

In this embodiment of the present disclosure, index information is not only added to the root node and the intermediate node that are included in the metadata, but also added to the data node. Because steps for a manner of processing the root node, the intermediate node, or the data node are the same, for ease of description, only the term "node" is used for description. The index information is a pointer variable pointing to a node. The brother index information is used to point to the adjacent node belonging to the same layer as the node. In a binary tree, usually, child nodes that belong to a same parent node are referred to as brother nodes, and adjacent nodes that belong to different parent nodes are referred to as cousin nodes. The parent index information is used to record a pointer pointing to the parent node of the node. If the node is not a root node, the node has a unique parent node. The child index information is used to record a pointer pointing to the child node of the node, and the node may have one or more child nodes. Provided that the metadata is stored by using a tree structure, a node can be recovered by using the method regardless of a binary tree or a multi-way tree.

Figure 4:
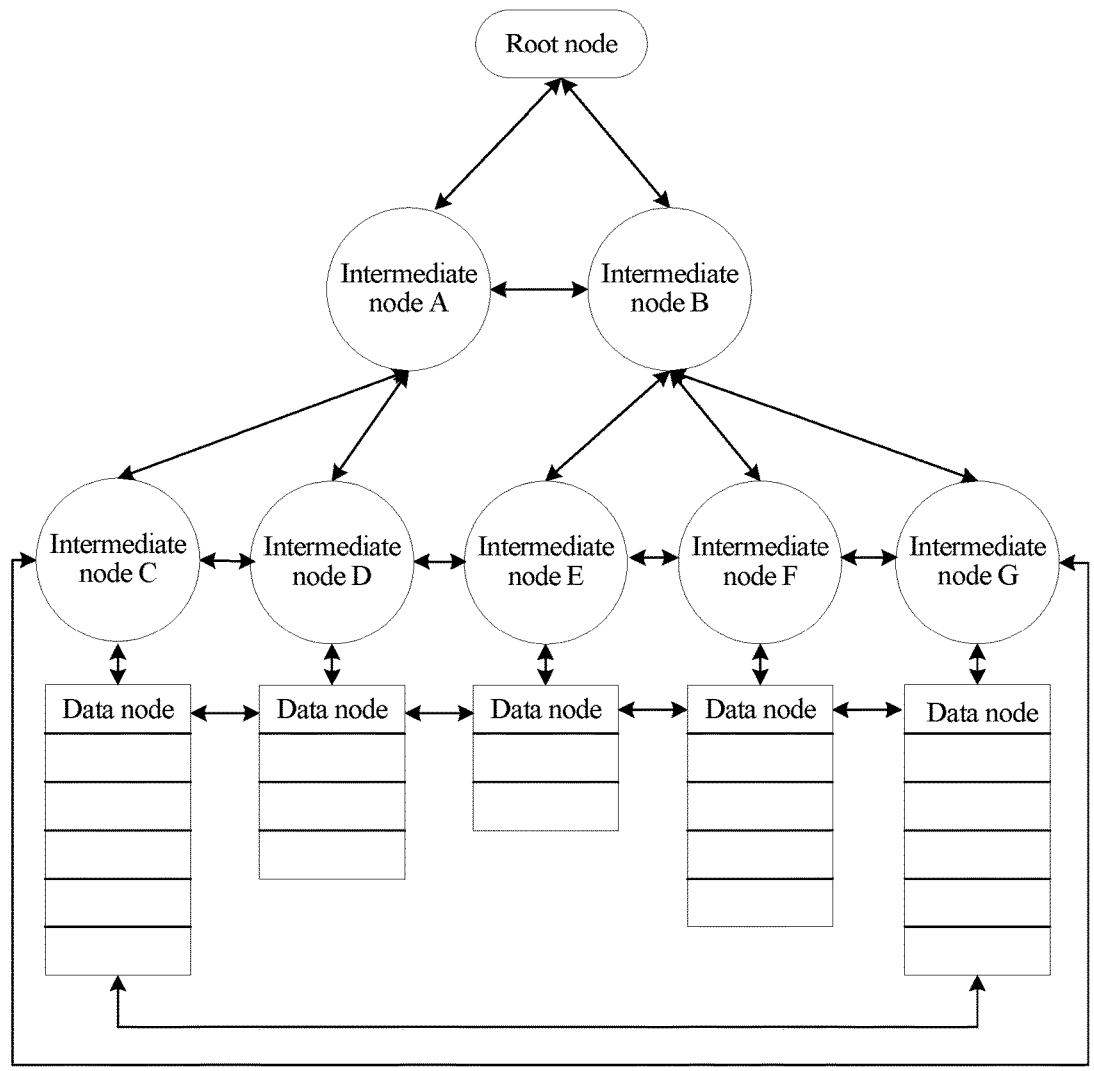
FIG. 4 is a schematic diagram of a virtualized storage structure according to an embodiment of the present disclosure.

In a tree storage structure, as shown in FIG. 4, a root node is located at an uppermost layer (the first layer), an intermediate node directly cascaded with the root node is a lower layer (the second layer) of the root node, and by analogy, an intermediate node at the third layer is located at a lower layer of the second-layer intermediate node. An intermediate node located at a tail end is also referred to as a leaf node, and each leaf node is cascaded with one data node.

Two adjacent intermediate nodes (or data nodes) that are located at a same layer are referred to as brother nodes no matter whether the two intermediate nodes (or data nodes) belong to a same parent node. Using the third layer in FIG. 4 as an example, if an intermediate node D is on the left of an intermediate node E, the intermediate node D is a left brother of the intermediate node E, and the intermediate node E is a right brother of the intermediate node D. If an intermediate node F is on the right of the intermediate node E, the intermediate node F is a right brother of the intermediate node E, and the intermediate node E is a left brother of the intermediate node F.

The following provides a specific implementation manner of a node structure definition in the foregoing index information:

```
typedef struct tagMultiDiNode_S
{
struct tagMultiDiTree_S *father;//record a location of a parent node
struct tagMultiDiTree_S *rBro;//record a location of a right brother node
struct tagMultiDiTree_S *lBro;//record a location of a left brother node
struct tagMultiDiTree_S *rChild;//record a location of a right child node
struct tagMultiDiTree_S *lChild;//record a location of a left child node
} MultiDiNode_S,
``` where *father points to a parent node. *rBro (right brother) points to a right brother node, *lBro (left brother) points to a left brother, *rChild (right children) points to a right child node, and *lChild (left children) points to a left child node.

A manner for searching for the target node is: traversing the metadata tree, determining in sequence whether a current node and another node cascaded with the current node can be accessed, and if a node cannot be accessed, determining the node that cannot be accessed as the target node.

Figure 5:
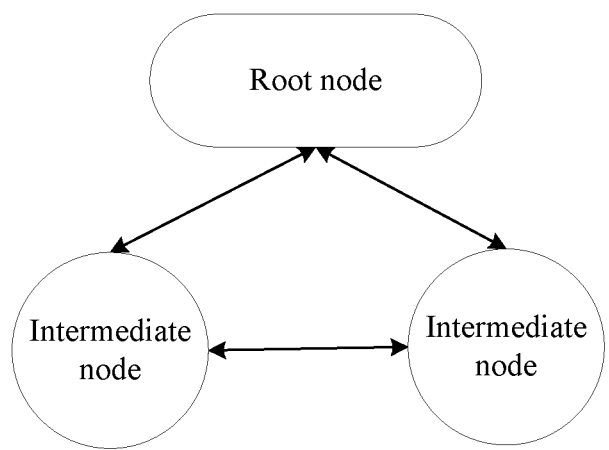
FIG. 5 is a schematic structural diagram of a binary tree for virtualized storage according to an embodiment of the present disclosure.

The manner of traversing the metadata tree may be pre-order traversal, post-order traversal, or in-order traversal. Using a binary tree shown in FIG. 5 as an example, when the pre-order traversal is used, if the root is not empty, whether a left child node and a right child node that are of a root have been damaged is sequentially determined. Specifically, the root node is determined as a current node, and it is determined whether the current node is empty. If the current node is empty, the process ends, or if the current node is not empty, it is determined whether a left child node of the current node is damaged. If the left child node of the current node is damaged, the left child of the current node is recovered, or if the left child node of the current node is undamaged, it is determined whether a right child node of the current node is damaged. If the right child node of the current node is damaged, the right child of the current node is recovered, or if the right child node of the current node is undamaged, the process ends (namely, there is no damaged node). The foregoing traversal method is converted to the following code:

Step 102: Recover index information in the target node according to index information recorded in a related node.

The related node includes a parent node, a child node, and a brother node (namely, an adjacent node belonging to a same layer as the node) that are of the target node. The index information includes brother index information pointing to the adjacent node belonging to the same layer as the node, parent index information pointing to the parent node of the node, and child index information pointing to the child node of the node. When the node has multiple child nodes, there are multiple pieces of child index information correspondingly, and the child index information and the child nodes are in a one-to-one correspondence.

When the index information in the target node is being recovered, all index information in the target node may be recovered, or missing (or wrongly recorded) index information in the target node may be first determined and then the missing (or wrongly recorded) index information may be recovered.

Figure 6:
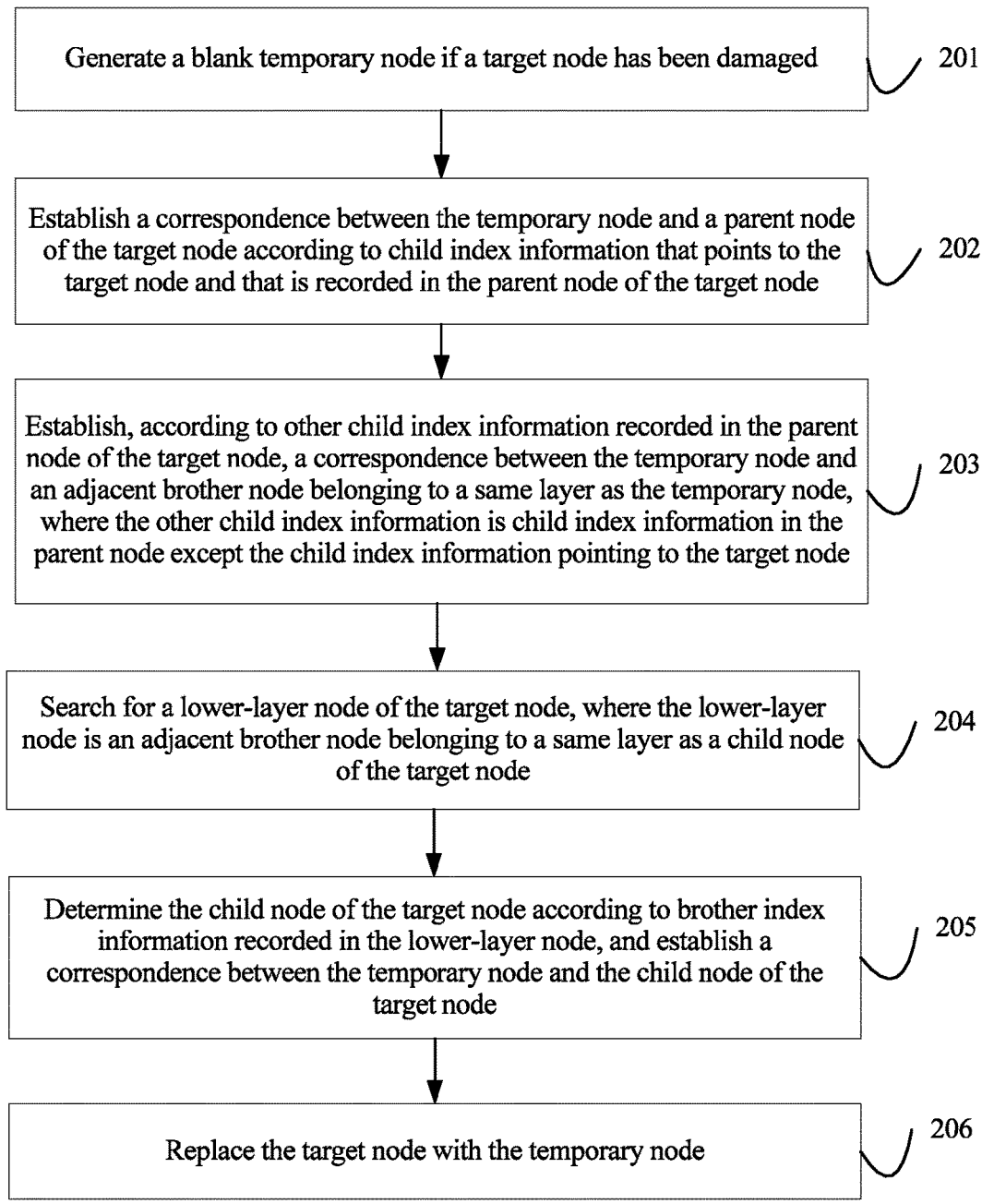
FIG. 6 is a flowchart 2 of a metadata recovery method according to an embodiment of the present disclosure.

For a manner of recovering all the index information, as shown in FIG. 6, when the target node has been damaged, step 102 may be performed in the following manner:

Step 201: Generate a blank temporary node if the target node has been damaged.

The temporary node is configured to replace the target node.

Step 202: Establish a correspondence between the temporary node and a parent node of the target node according to child index information that points to the target node and that is recorded in the parent node of the target node.

```
int traverse(MultiDiNode_S *treenode){
        int result=0;
        if (NULL == treenode){
     return 0;
}
     if (a current node is damaged)
          return −1;
}
     result = traverse(treenode->lchild);//traverse a left child node of a
current node
     if (result == −1) {
        funcRepairByRbro(treenode,left);//if the left child node is damaged,
repair the left child by executing a repair function.
     }
   result = traverse(treenode->rchild);
     if (result == −1) {
        funcRepairByRbro(treenode,right); //if the right child node is
damaged, repair the right child by executing a repair function.
     }
 },
``` where funcRepairByRbro is a functional function and is used to recover a left child or a right child, and for a definition of the functional function, reference may be made to the following descriptions in this embodiment of the present disclosure; and a traverse function is used to access a node in a tree, and a specific implementation manner is not limited herein.

During tree traversal, traversal is usually performed in a root-to-leaf direction. If the target node has been damaged, the target node cannot be read from the parent node of the target node. It can be seen that the parent node of the target node can be accessed although the target node has been damaged. Further, the correspondence between the temporary node and the parent node of the target node can be established according to the child index information that points to the target node and that is recorded in the parent node of the target node.

Step 203: Establish, according to other child index information recorded in the parent node of the target node, a correspondence between the temporary node and an adjacent brother node belonging to a same layer as the temporary node, where the other child index information is child index information in the parent node except the child index information pointing to the target node.

Step 204: Search for a lower-layer node of the target node, where the lower-layer node is an adjacent brother node belonging to a same layer as a child node of the target node.

Step 205: Determine the child node of the target node according to brother index information recorded in the lower-layer node, and establish a correspondence between the temporary node and the child node of the target node.

Step 206: Replace the target node with the temporary node.

To further describe the recovery method shown in FIG. 6, the following provides two specific implementation manners in a binary-tree scenario.

Scenario 1: The damaged target node is a right child node.

Figure 7:
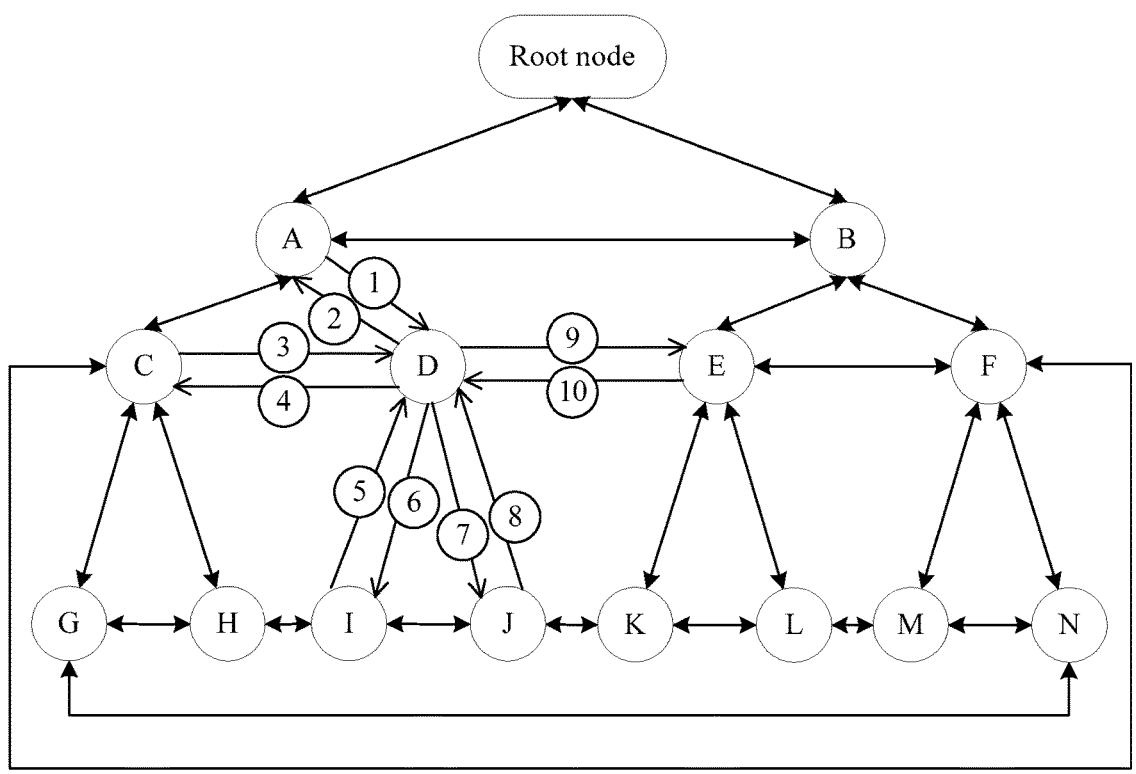
FIG. 7 is a schematic structural diagram of metadata according to an embodiment of the present disclosure.

For ease of understanding a recovery procedure of a right child node in a binary tree, FIG. 7 provides a specific schematic structural diagram of metadata. The metadata is a binary tree, left and right children of a root are a node A and a node B respectively, left and right children of the node A are a node C and a node D respectively, left and right children of the node B are a node E and a node F respectively, left and right children of the node C are a node G and a node H respectively, left and right children of the node D are a node I and a node J respectively, left and right children of the node E are a node K and a node L respectively, and left and right children of the node F are a node M and a node N respectively. It is assumed that a target node in FIG. 7 is the node D.

Step 201: Generate a temporary node (tempnode) if the target node has been damaged.

The temporary node is configured to replace the target node.

If the target node has been damaged, a new node (to which no value or an initial value is assigned) needs to be applied for to serve as the temporary node. A data structure of the node includes index information that is included in tagMultiDiNode_S, and tempnode is a pointer pointing to the temporary node. After all values required by the temporary node are assigned to the temporary node, the target node is replaced with the temporary node, so as to recover the target node.

Step 202a: Establish a correspondence between the temporary node and a parent node of the target node according to child index information that points to the target node and that is recorded in the parent node of the target node.

(1) A right child node of the parent node (fathernode→rchild) of the target node is determined as the temporary node (tempnode).

As shown by 1 in FIG. 7, because a parent node of the node D is the node A, right child index information in A is determined as a pointer pointing to the temporary node.

(2) A parent node of the temporary node (tempnode→father) is determined as the parent node (fathernode) of the target node.

As shown by 2 in FIG. 7, parent index information in the temporary node is determined as a pointer pointing to the node A.

Step 203a: Establish, according to other child index information recorded in the parent node of the target node, a correspondence between the temporary node and an adjacent brother node belonging to a same layer as the temporary node, where the other child index information is child index information in the parent node except the child index information pointing to the target node.

Step 204a: Search for a lower-layer node of the target node, where the lower-layer node is an adjacent brother node belonging to a same layer as the child node of the target node.

The lower-layer node (ptr) is determined as a right brother node of a right child node of a left child node of the parent node (fathernode→lchild→rchild→rBro) of the target node, and ptr is a pointer pointing to the lower-layer node.

In FIG. 7, when the node D is the target node, the parent node of the target node is the node A, the left child node of the parent node (the node A) of the target node is the node C, the right child node of the left child node (the node C) of the parent node of the target node is the node H, and the right brother node of the right child node (the node H) of the left child node of the parent node of the target node is the node I. Therefore, the node I is the lower-layer node.

Step 205a: Determine the child node of the target node according to brother index information recorded in the lower-layer node, and establish a correspondence between the temporary node and the child node of the target node.

Step 203a to step 205a may be performed in the following manner:

(1) A left brother node of the temporary node (tempnode→lBro) is determined as a left child node of the parent node (fathernode→lchild) of the target node.

As shown by 3 in FIG. 7, the left child node of the parent node (the node A) of the target node is the node C. Therefore, left brother index information in the temporary node (tempnode→lBro) is determined as a pointer pointing to the node C.

(2) A right brother node of the left child node of the parent node (fathernode→lchild→rBro) of the target node is determined as the temporary node (tempnode).

As shown by 4 in FIG. 7, right brother index information in the left child node (the node C) of the parent node of the target node is determined as a pointer pointing to the temporary node.

(3) A left child node of the temporary node (tempnode→lchild) is determined as the lower-layer node (ptr).

As shown by 5 in FIG. 7, left child index information in the temporary node is determined as a pointer (ptr) pointing to the lower-layer node (the node I).

(4) A parent node of the lower-layer node (ptr→father) is determined as the temporary node (tempnode).

As shown by 6 in FIG. 7, parent index information in the lower-layer node (the node I) is determined as a pointer pointing to the temporary node.

(5) A right child node of the temporary node (tempnode→rchild) is determined as a right brother node of the lower-layer node (ptr→rBro).

As shown by 7 in FIG. 7, the right brother node of the lower-layer node (the node I) is the node J. Therefore, right child index information in the temporary node (tempnode→rchild) is determined as a pointer pointing to the node J.

(6) A parent node of the right brother node of the lower-layer node (ptr→rBro→father) is determined as the temporary node (tempnode).

As shown by 8 in FIG. 7, the right brother node of the lower-layer node is the node J. Parent index information in the node J is determined as a pointer pointing to the temporary node.

(7) A right brother node of the temporary node (tempnode→rBro) is determined as a parent node of a right brother node of the right child node of the temporary node (tempnode→rchild→rBro→father).

As shown by 9 in FIG. 7, the right child node of the temporary node is the node J, the right brother node of the right child node of the temporary node is the node K, and the parent node of the right brother node (the node K) of the right child node of the temporary node is the node E. Therefore, right brother index information in the temporary node is determined as a pointer pointing to the node E.

(8) A left brother node of the parent node of the right brother node of the right child node of the temporary node (tempnode→rchild→rBro→father→lBro) is determined as the temporary node (tempnode).

As shown by 10 in FIG. 7, the parent node of the right brother node of the right child node of the temporary node is the node E. Therefore, left brother index information in the node E is determined as a pointer pointing to the temporary node.

Code corresponding to the scenario 1 is as follows:

```
int funcRepairByRbro(MultiDiNode_S *fathernode,int child){
    MultiDiNode_S *ptr,*tempnode;// *ptr points to a lower-layer node, and
*tempnode points to a temporary node
    if (right == child) //if a right child is damaged
  {
    tempnode =allocNewNode;//apply for a temporary node (a replacement node);
    //recover parent index information in the temporary node
    fathernode->rchild= tempnode;
    tempnode->father = fathernode;
  ptr =fathernode->lchild->rchild->rBro;//retrieve lower-layer data in a target
node
  //recover child index information and brother index information in the
temporary node
   tempnode->lBro = fathernode->lchild;
   fathernode->lchild->rBro=tempnode;
   tempnode->lchild = ptr;
   ptr->father = tempnode;
   tempnode->rchild = ptr->rBro;
   ptr->rBro->father = tempnode;
   tempnode->rBro = tempnode->rchild->rBro->father;
   tempnode->rchild->rBro->father->lBro = tempnode;
  }
}
```

Scenario 2: The damaged target node is a left child.

For ease of understanding a recovery procedure of a left child node in a binary tree, FIG. 8 provides a specific schematic structural diagram of metadata. The metadata is a binary tree, left and right children of a root are a node A and a node B respectively, left and right children of the node A are a node C and a node D respectively, left and right children of the node B are a node E and a node F respectively, left and right children of the node C are a node G and a node H respectively, left and right children of the node D are a node I and a node J respectively, left and right children of the node E are a node K and a node L respectively, and left and right children of the node F are a node M and a node N respectively. It is assumed that a target node in FIG. 8 is the node E.

Step 201: Generate a blank temporary node if the target node has been damaged.

The temporary node is configured to replace the target node. Tempnode is a pointer pointing to the temporary node. The temporary node is configured to replace the target node.

Step 202*b*: Establish a correspondence between the temporary node and a parent node of the target node according to child index information that points to the target node and that is recorded in the parent node of the target node.

(1) A left child of the parent node (fathernode→rchild) of the target node is determined as the temporary node (tempnode).

As shown by 1 in FIG. 8, because the parent node of the node E is the node B, left child index information in B is determined as a pointer pointing to the temporary node.

(2) A parent node of the temporary node (tempnode→father) is determined as the parent node (fathernode) of the target node.

As shown by 2 in FIG. 8, parent index information in the temporary node is determined as a pointer pointing to the node B.

Step 203*b*: Establish, according to other child index information recorded in the parent node of the target node, a correspondence between the temporary node and an adjacent brother node belonging to a same layer as the temporary node, where the other child index information is child index information in the parent node except the child index information pointing to the target node.

Step 204*b*: Search for a lower-layer node of the target node, where the lower-layer node is an adjacent brother node belonging to a same layer as the child node of the target node.

The lower-layer node (ptr) is determined as a left brother of a left child of a right child of the parent node (fathernode→rchild→lchild→lBro) of the target node, and ptr is a pointer pointing to the lower-layer node.

In FIG. 8, when the node E is the target node, the parent node of the target node is the node B, the right child of the parent node (the node B) of the target node is the node F, the left child of the right child (the node F) of the parent node of the target node is the node M, and the left brother of the left child (the node F) of the right child of the parent node of the target node is the node L. Therefore, the node L is the lower-layer node.

Step 205*b*: Determine the child node of the target node according to brother index information recorded in the lower-layer node, and establish a correspondence between the temporary node and the child node of the target node.

Step 206b: Replace the target node with the temporary node.

Step 203b to step 205b may be performed in the following manner:

(1) A right brother node of the temporary node (tempnode→rBro) is determined as a right child node of the parent node (fathernode→rchild) of the target node.

As shown by 3 in FIG. 8, the right child node of the parent node (the node B) of the target node is the node F. Therefore, right brother index information in the temporary node (tempnode→lBro) is determined as a pointer pointing to the node F.

(2) A left brother node of the right child node of the parent node (fathernode→rchild→lBro) of the target node is determined as the temporary node (tempnode).

As shown by 4 in FIG. 8, left brother index information in the right child node (the node F) of the parent node of the target node is determined as a pointer pointing to the temporary node.

(3) A right child node of the temporary node (tempnode→rchild) is determined as the lower-layer node (ptr).

As shown by 5 in FIG. 8, right child index information in the temporary node is determined as a pointer pointing to the lower-layer node (the node L).

(4) A parent node of the lower-layer node (ptr→father) is determined as the temporary node (tempnode).

As shown by 6 in FIG. 8, parent index information in the lower-layer node (the node L) is determined as the temporary node.

(5) A left child node of the temporary node (tempnode→lchild) is determined as a left brother node of the lower-layer node (ptr→lBro).

As shown by 7 in FIG. 8, the left brother node of the lower-layer node (the node L) is the node K. Therefore, left child index information in the temporary node (tempnode→rchild) is determined as a pointer pointing to the node K.

(6) A parent node of the left brother node of the lower-layer node (ptr→lBro→father) is determined as the temporary node (tempnode).

As shown by 8 in FIG. 8, the left brother node of the lower-layer node is the node K. Parent index information in the node K is determined as a pointer pointing to the temporary node.

(7) A left brother node of the temporary node (tempnode→lBro) is determined as a parent node of a left brother node of the left child node of the temporary node (tempnode→lchild→lBro→father).

As shown by 9 in FIG. 8, the left child node of the temporary node is the node K, the left brother node of the left child node (the node K) of the temporary node is the node J, and the parent node of the left brother node (the node J) of the left child node of the temporary node is the node D. Therefore, left brother index information in the temporary node is determined as a pointer pointing to the node D.

(8) A right brother node of the parent node of the left brother node of the left child node of the temporary node (tempnode→lchild→lBro→father→rBro) is determined as the temporary node (tempnode).

As shown by 10 in FIG. 8, the parent node of the left brother node of the left child node of the temporary node is the node D. Therefore, right brother index information in the node D is determined as a pointer pointing to the temporary node.

Code corresponding to the scenario 2 is as follows:

```
int funcRepairByRbro(MultiDiNode_S *fathernode,int child){
    MultiDiNode_S *ptr,*tempnode;// *ptr points to a lower-layer node, and *tempnode points to a temporary node
    if (left == child) //if a left child is damaged
    {
        tempnode =allocNewNode;//apply for a temporary node (a replacement node);
        //recover parent index information in the temporary node
        fathernode->lchild= tempnode;
        tempnode->father = fathernode;
        ptr =fathernode->rchild->lchild->lBro;//retrieve lower-layer data in a target node
        //recover child index information and brother index information in the temporary node
        tempnode->rBro = fathernode->rchild;
        fathernode->rchild->lBro=tempnode;
        tempnode->rchild = ptr;
        ptr->father = tempnode;
        tempnode->lchild = ptr->lBro;
        ptr->lBro->father = tempnode;
        tempnode->lBro = tempnode->lchild->lBro->father;
        tempnode->lchild->lBro->father->rBro = tempnode;
    }
}
```

According to the metadata recovery method provided in this embodiment of the present disclosure, during recovery of a target node, index information in the target node is recovered by using index information recorded in a related node, thereby recovering a connection between a root and a data node. In the prior art, merely backup is performed, and no index information is recorded in nodes. Therefore, when a node is damaged, the damaged node cannot be recovered unless a backup is used for replacement. In the present disclosure, because index information pointing to a brother node, a parent node, and a child node that are of a node is added to the node, when the target node is damaged, the index information in the target node can be recovered by using index information that is recorded in a parent node, a child node, and a brother (or cousin) node that are of the target node, thereby restoring a connection between a root and each data node and ensuring successful reading of virtual data.

For a case in which a target node is undamaged but index information recorded in the target node has been lost, an embodiment of the present disclosure further provides a metadata recovery method. As a further description of the foregoing embodiment, step 102 of recovering index information in the target node according to index information recorded in a related node specifically includes:

added to the node structure definition in this embodiment of the present disclosure. The home information is used to describe a tree to which a node belongs, and the node structure definition is specifically:

```
typedef struct tagMultiDiNode_S
{
unsigned long self_description[USR_DEFINED_LENGTH];//self-description information
    struct tagMultiDiTree_S *father;//record a location of a parent node
    struct tagMultiDiTree_S *rBro;//record a location of a right brother node
    struct tagMultiDiTree_S *lBro;//record a location of a left brother node
    struct tagMultiDiTree_S *rChild;//record a location of a right child node
    struct tagMultiDiTree_S *lChild;//record a location of a left child node
} MultiDiNode_S,
```

201': If the index information recorded in the target node has been lost, establish a correspondence between the target node and a parent node of the target node according to child index information that points to the target node and that is recorded in the parent node of the target node.

202': Establish, according to other child index information recorded in the parent node of the target node, a correspondence between the target node and an adjacent brother node belonging to a same layer as the target node, where the other child index information is child index information in the parent node except the child index information pointing to the target node.

203': Search for a lower-layer node of the target node, where the lower-layer node is an adjacent brother node belonging to a same layer as the child node of the target node.

204': Determine the child node of the target node according to brother index information recorded in the lower-layer node, and establish a correspondence between the target node and the child node of the target node.

According to the metadata recovery method provided in this embodiment of the present disclosure, when index information recorded in a target node has been lost, the index information in the target node can be recovered by using index information recorded in a related node, thereby recovering a connection between a root and a data node. In the prior art, merely backup is performed, and no index information is recorded in nodes. Therefore, when a node is damaged, the damaged node cannot be recovered unless a backup is used for replacement. In the present disclosure, because index information pointing to a brother node, a parent node, and a child node that are of a node is added to the node, when the index information recorded in the target node has been lost, the index information in the target node can be recovered by using index information that is recorded in a parent node, a child node, and a brother (or cousin) node that are of the target node, thereby restoring a connection between a root and each data node and ensuring successful reading of virtual data.

In the foregoing embodiment, an intermediate node or a data node can be recovered if there is at least one path between a root and any data node. In a process of implementing the foregoing method, it is found that: in some extreme environments, for example, if all intermediate nodes are lost, all the intermediate nodes cannot be recovered according to the method provided in the foregoing embodiment. Based on this case, an embodiment of the present disclosure further provides a metadata recovery method. With reference to the node structure definition provided in the foregoing embodiment, home information is where self_description is the home information, and a data type of self_description is not limited to unsigned long.

A specific format of home information may be defined by a user according to different usage scenarios, provided that a tree to which a node belongs can be determined by using the home information.

Based on the foregoing node structure definition, as shown in FIG. 9, the method further includes:

Step 301: Find, according to home information of each node in a target tree when each node is the target node, a home node that belongs to the target tree.

The target tree is a tree on which whether data needs to be recovered is currently detected. All nodes including a root node, a data node, and an intermediate node in storage space are traversed to find the home node that belongs to the target tree.

Step 302: Recover an intermediate node and a data node that are in the target tree according to the found home node.

After the home node is found, the remaining nodes in the target tree are recovered according to the method described in the foregoing embodiments.

According to the metadata recovery method provided in this embodiment of the present disclosure, home information can be added to a node structure, so as to identify a tree to which a node belongs. When all intermediate nodes in a target tree have been damaged, all home nodes that belong to the target tree are found, and then the target tree is recovered based on the found home nodes, ensuring that recovery can still be performed when all the intermediate nodes are damaged, and further improving data reliability.

It is found that: in a prior-art manner of storing a backup of metadata, if a primary file changes in a backup process, the primary file is different from a secondary file that is obtained after the backup. When the secondary file is used for recovery, data in the different part cannot be recovered. Based on this, an embodiment of the present disclosure further provides a metadata recovery method, where the method includes:

adding index information to each node when each node is generated.

According to the metadata recovery method provided in this embodiment of the present disclosure, backup is not required, and index information is added to a node when the node is generated. Therefore, a problem in the prior art that a secondary file is different from a primary file can be overcome, and recovered data is the same as original data, improving data recovery efficiency.

Figure 10:
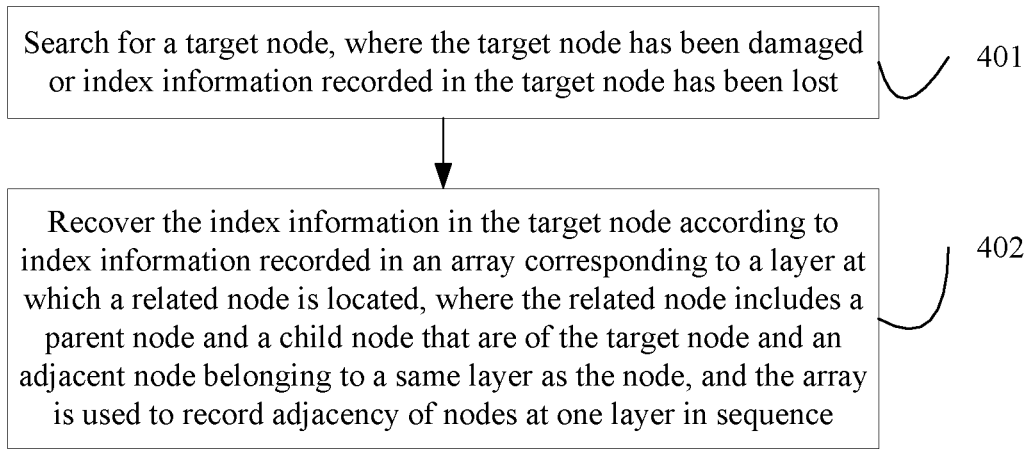
FIG. 10 is a flowchart 4 of a metadata recovery method according to an embodiment of the present disclosure.

When metadata is being recovered by using the foregoing method, it is found that: in addition to adding index information to a node structure definition, a sequence of nodes stored at each layer may be further saved by using an array, so that the metadata can be recovered according to information stored in the array. Based on the foregoing technical conception, an embodiment of the present disclosure further provides a metadata recovery method. As shown in FIG. 10, the method includes:

Step 401: Search for a target node, where the target node has been damaged or index information recorded in the target node has been lost.

For a method for searching for the target node, refer to the implementation manner in the foregoing embodiment.

Before step 401, the method further includes: creating an array for a node at each layer, where each array is used to record adjacency of nodes at one layer in sequence.

In an example of the metadata shown in FIG. 4, the first layer is recorded as [R] by using an array 0, the second layer is recorded as [A, B] by using an array 1, and the third layer is recorded as [C, D, E, F, G] by using an array 2.

Step 402: Recover the index information in the target node according to index information recorded in an array corresponding to a layer at which a related node is located, where the related node includes a parent node and a child node that are of the target node and an adjacent node belonging to a same layer as the node, and the array is used to record adjacency of nodes at one layer in sequence.

During recovery, a brother node of the node may be determined according to a subscript of an array. For example, at the third layer, [2, 0] corresponds to C, [2, 1] corresponds to D, [2, 2] corresponds to E, [2, 3] corresponds to F, and [2, 4] corresponds to G. If the target node is D [2, 1], 1 is subtracted from a column number of the target node to obtain a left brother C [2, 0] of the target node; or 1 is added to the column number of the target node to obtain a left brother E [2, 2] of the target node. A parent pointer and a child pointer that are of the target node may also be deduced according to a location of the target node, and further, the parent node and the child node that are of the target node are determined by using subscripts in the arrays.

According to the metadata recovery method provided in this embodiment of the present disclosure, a location relationship of nodes located at a same layer can be recorded by using an array form. Compared with determining a brother node of a target node by using a pointer, the brother node of the target node can be directly determined herein by using a sequence number, thereby increasing a metadata recovery speed.

Figure 11:
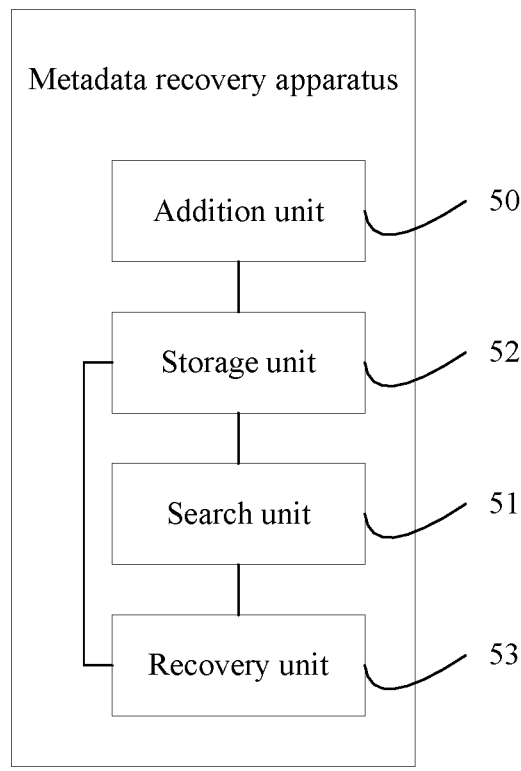
FIG. 11 is a schematic structural diagram 1 of a metadata recovery apparatus according to an embodiment of the present disclosure.

An embodiment of the present disclosure further provides a metadata recovery apparatus. As shown in FIG. 11, the apparatus includes:

a search unit 51, configured to search for a target node in nodes stored by a storage unit 52, where the target node has been damaged or index information recorded in the target node has been lost; and a recovery unit 53, configured to recover, according to index information recorded in a related node stored by the storage unit 52, the index information in the target node found by the search unit 51, where the related node includes a parent node and a child node that are of the target node and an adjacent node belonging to a same layer as the node.

The apparatus further includes an addition unit 50, configured to add index information to each node stored by the storage unit 52, where the node includes a root node, an intermediate node, and a data node, and the index information includes brother index information pointing to an adjacent node belonging to a same layer as the node, parent index information pointing to a parent node of the node, and child index information pointing to a child node of the node.

According to the metadata recovery apparatus provided in this embodiment of the present disclosure, during recovery of a target node, index information in the target node is recovered by using index information recorded in a related node, thereby recovering a connection between a root and a data node. In the prior art, merely backup is performed, and no index information is recorded in nodes. Therefore, when a node is damaged, the damaged node cannot be recovered unless a backup is used for replacement. In the present disclosure, because index information pointing to a brother node, a parent node, and a child node that are of a node is added to the node, when the target node is damaged, the index information in the target node can be recovered by using index information that is recorded in a parent node, a child node, and a brother (or cousin) node that are of the target node, thereby restoring a connection between a root and each data node and ensuring successful reading of virtual data.

Figure 12:
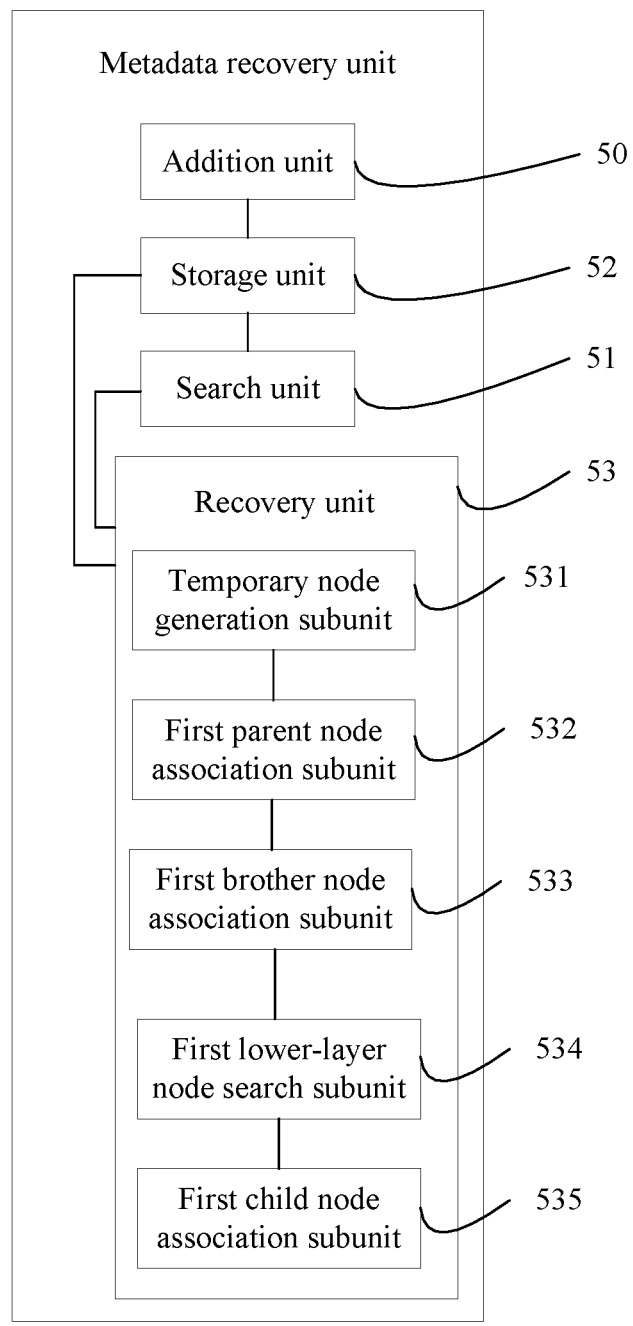
FIG. 12 is a schematic structural diagram 2 of a metadata recovery apparatus according to an embodiment of the present disclosure.

Further, as shown in FIG. 12, the recovery unit 53 specifically includes:

a temporary node generation subunit 531, configured to: when the target node has been damaged, generate a blank temporary node, where the temporary node is configured to replace the target node;

a first parent node association subunit 532, configured to establish a correspondence between the temporary node and the parent node of the target node according to child index information that points to the target node and that is recorded in the parent node of the target node found by the search unit 51;

a first brother node association subunit 533, configured to establish, according to other child index information recorded in the parent node of the target node found by the search unit 51, a correspondence between the temporary node and an adjacent brother node belonging to a same layer as the temporary node, where the other child index information is child index information in the parent node except the child index information pointing to the target node;

a first lower-layer node search subunit 534, configured to search for a lower-layer node of the target node found by the search unit 51, where the lower-layer node is an adjacent brother node belonging to a same layer as the child node of the target node; and a first child node association subunit 535, configured to: determine the child node of the target node according to brother index information recorded in the lower-layer node found by the first lower-layer node search subunit 534, and establish a correspondence between the temporary node and the child node of the target node.

Figure 13:
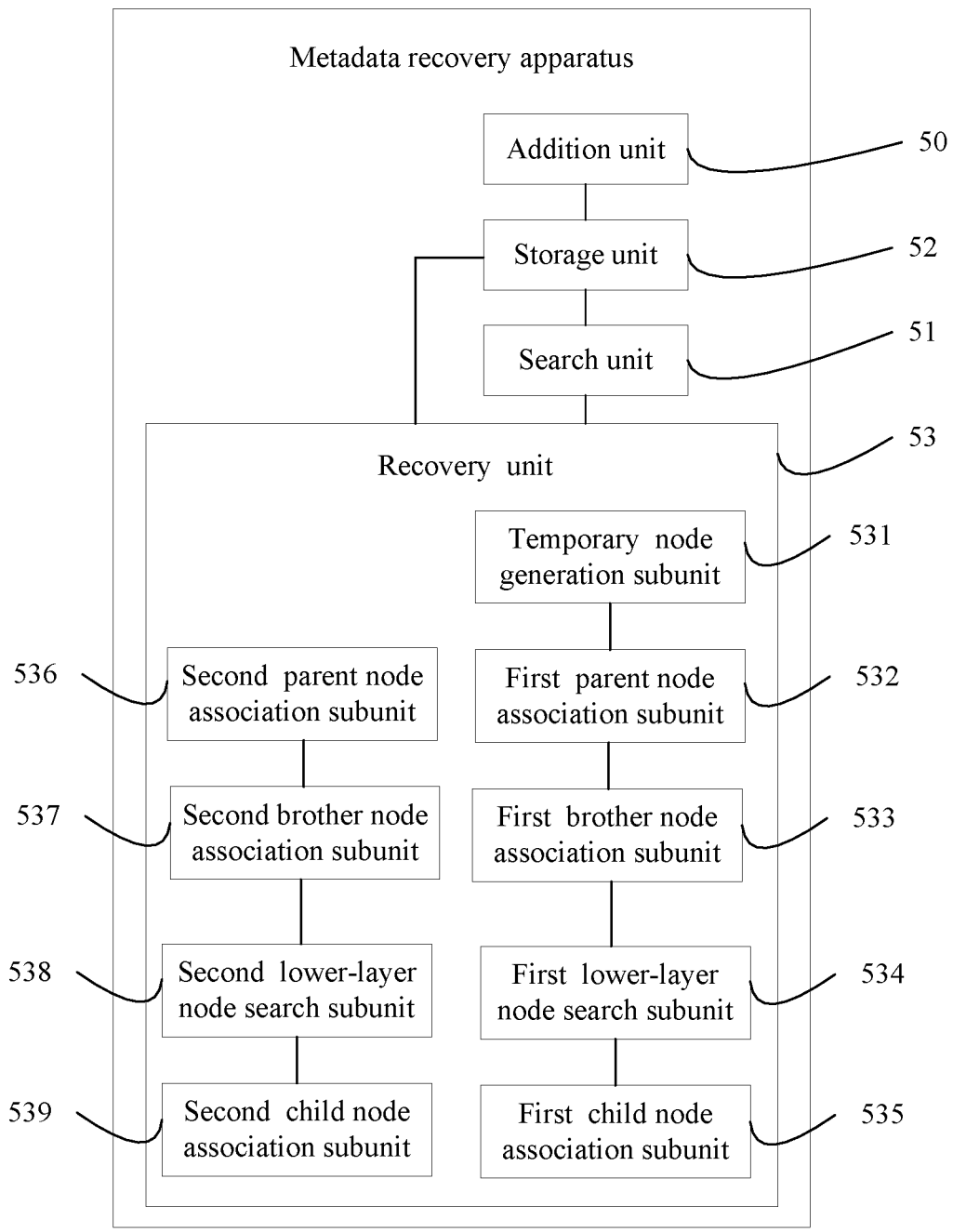
FIG. 13 is a schematic structural diagram 3 of a metadata recovery apparatus according to an embodiment of the present disclosure.

Further, as shown in FIG. 13, the recovery unit further includes:

a second parent node association subunit 536, configured to: when the index information recorded in the target node found by the search unit 51 has been lost, establish a correspondence between the target node and the parent node of the target node according to child index information that points to the target node and that is recorded in the parent node of the target node;

a second brother node association subunit 537, configured to establish, according to other child index information recorded in the parent node of the target node found by the search unit 51, a correspondence between the target node and an adjacent brother node belonging to the same layer as the target node, where the other child index information is child index information in the parent node except the child index information pointing to the target node;

a second lower-layer node search subunit 538, configured to search for a lower-layer node of the target node, where the lower-layer node is an adjacent brother node belonging to a same layer as the child node of the target node; and a second child node association subunit 539, configured to: determine the child node of the target node according to brother index information recorded in the lower-layer node found by the second lower-layer node search subunit 538, and establish a correspondence between the target node and the child node of the target node.

Further, the index information further includes home information, and the home information is used to describe a tree to which a node belongs.

Figure 14:
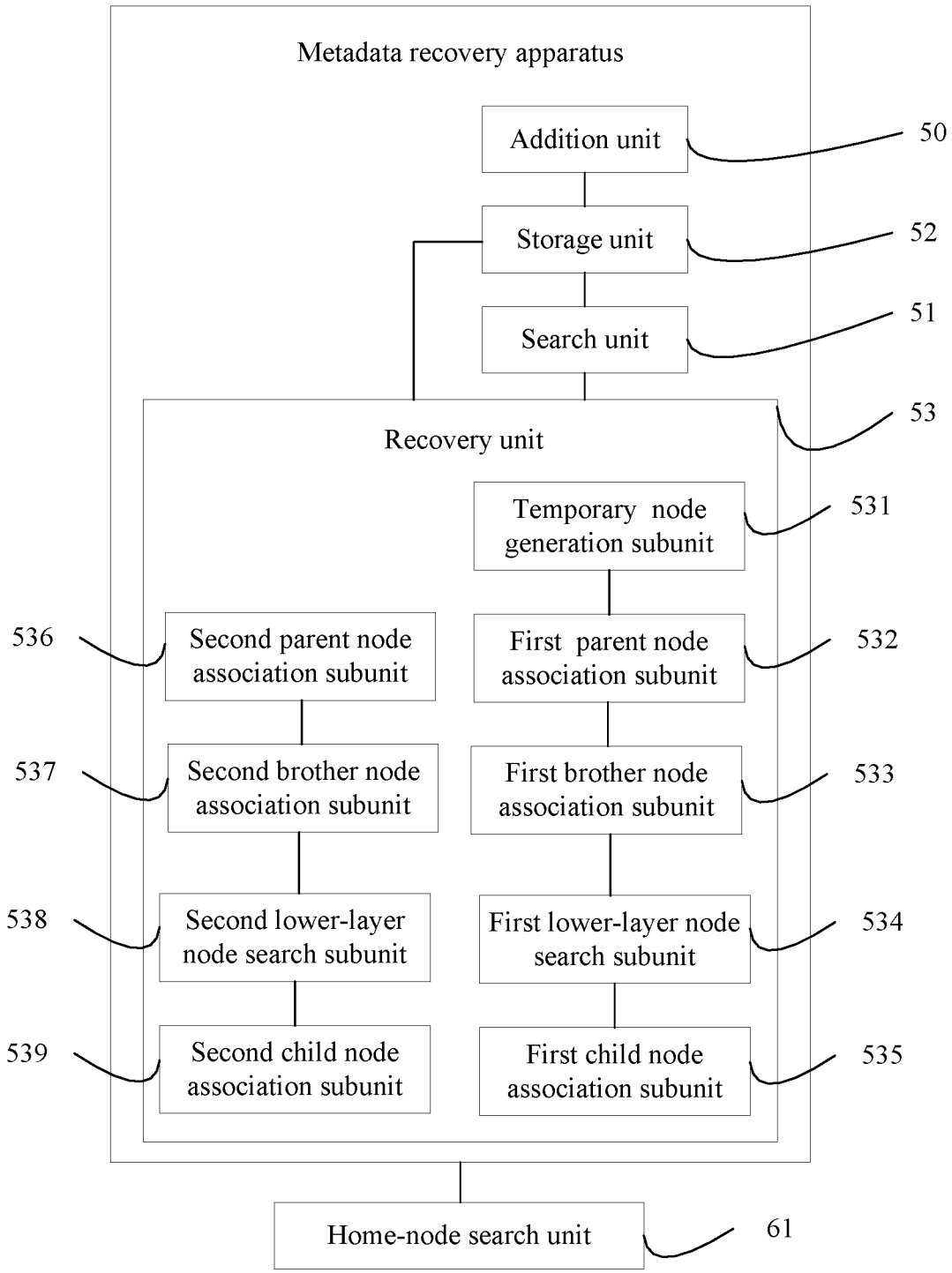
FIG. 14 is a schematic structural diagram 4 of a metadata recovery apparatus according to an embodiment of the present disclosure.

As shown in FIG. 14, the apparatus further includes:

a home-node search unit 61, configured to find, according to home information of each node in a target tree when each node is the target node, a home node that belongs to the target tree; and the recovery unit 53 is further configured to recover an intermediate node and a data node that are of the target tree according to the home node found by the home-node search unit 61.

According to the metadata recovery apparatus provided in this embodiment of the present disclosure, home information can be added to a node structure, so as to identify a tree to which a node belongs. When all intermediate nodes in a target tree have been damaged, all home nodes that belong to the target tree are found, and then the target tree is recovered based on the found home nodes, ensuring that recovery can still be performed when all the intermediate nodes are damaged, and further improving data reliability.

Further, the addition unit 50 is further configured to:

add index information to each node when each node is generated.

According to the metadata recovery apparatus provided in this embodiment of the present disclosure, backup is not required, and index information is added to a node when the node is generated. Therefore, a problem in the prior art that a secondary file is different from a primary file can be overcome, and recovered data is the same as original data, improving data recovery efficiency.

Figure 15:
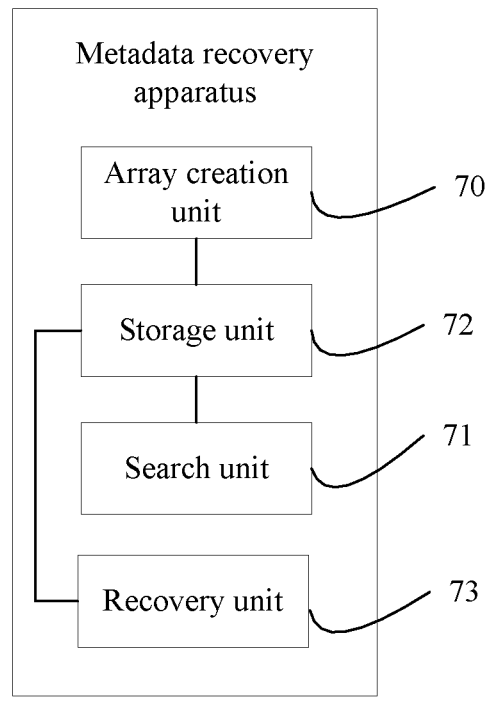
FIG. 15 is a schematic structural diagram 5 of a metadata recovery apparatus according to an embodiment of the present disclosure.

An embodiment of the present disclosure further provides a metadata recovery apparatus. As shown in FIG. 15, the apparatus includes:

a search unit 71, configured to search for a target node in nodes stored by a storage unit 72, where the target node has been damaged or index information recorded in the target node has been lost; and the apparatus further includes an array creation unit 70, configured to create an array for a node at each layer in the storage unit 72, where each array is used to record adjacency of nodes at one layer in sequence; and a recovery unit 73, configured to recover the index information in the target node according to index information recorded in an array corresponding to a layer at which a related node is located, where the related node includes a parent node and a child node that are of the target node and an adjacent node belonging to a same layer as the node.

According to the metadata recovery apparatus provided in this embodiment of the present disclosure, a location relationship of nodes located at a same layer can be recorded by using an array form. Compared with determining a brother node of a target node by using a pointer, the brother node of the target node can be directly determined herein by using a sequence number, thereby increasing a metadata recovery speed.

Figure 16:
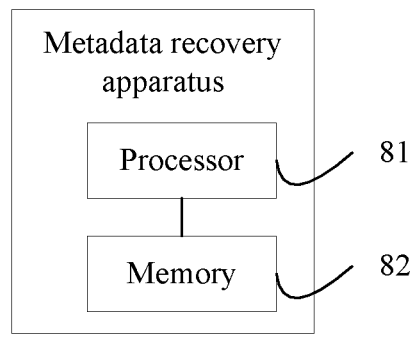
FIG. 16 is a schematic structural diagram 6 of a metadata recovery apparatus according to an embodiment of the present disclosure.

An embodiment of the present disclosure further provides a metadata recovery apparatus. As shown in FIG. 16, the apparatus includes:

a processor, configured to: search for a target node in nodes stored by a memory 82, where the target node has been damaged or index information recorded in the target node has been lost; and recover the index information in the target node according to index information recorded in a related node stored by the memory 82, where the related node includes a parent node and a child node that are of the target node and an adjacent node belonging to a same layer as the node, and the index information includes brother index information pointing to the adjacent node belonging to the same layer as the node, parent index information pointing to the parent node of the node, and child index information pointing to the child node of the node.

The processor 81 is further configured to add index information to each node stored by the memory 82, where the node includes a root node, an intermediate node, and a data node, and the index information includes brother index information pointing to an adjacent node belonging to a same layer as the node, parent index information pointing to a parent node of the node, and child index information pointing to a child node of the node.

According to the metadata recovery apparatus provided in this embodiment of the present disclosure, during recovery of a target node, index information in the target node is recovered by using index information recorded in a related node, thereby recovering a connection between a root and a data node. In the prior art, merely backup is performed, and no index information is recorded in nodes. Therefore, when a node is damaged, the damaged node cannot be recovered unless a backup is used for replacement. In the present disclosure, because index information pointing to a brother node, a parent node, and a child node that are of a node is added to the node, when the target node is damaged, the index information in the target node can be recovered by using index information that is recorded in a parent node, a child node, and a brother (or cousin) node that are of the target node, thereby restoring a connection between a root and each data node and ensuring successful reading of virtual data.

Further, the processor 81 is specifically configured to:

generate a blank temporary node if the target node has been damaged, where the temporary node is configured to replace the target node;

establish a correspondence between the temporary node and the parent node of the target node according to child index information that points to the target node and that is recorded in the parent node of the target node;

establish, according to other child index information recorded in the parent node of the target node, a correspondence between the temporary node and an adjacent brother node belonging to a same layer as the temporary node, where the other child index information is child index information in the parent node except the child index information pointing to the target node;

search for a lower-layer node of the target node, where the lower-layer node is an adjacent brother node belonging to a same layer as the child node of the target node;

determine the child node of the target node according to brother index information recorded in the lower-layer node, and establish a correspondence between the temporary node and the child node of the target node; and replace the target node with the temporary node.

Further, the processor 81 is specifically configured to:

if the index information recorded in the target node has been lost, establish a correspondence between the target node and the parent node of the target node according to child index information that points to the target node and that is recorded in the parent node of the target node;

establish, according to other child index information recorded in the parent node of the target node, a correspondence between the target node and an adjacent brother node belonging to the same layer as the target node, where the other child index information is child index information in the parent node except the child index information pointing to the target node;

search for a lower-layer node of the target node, where the lower-layer node is an adjacent brother node belonging to a same layer as the child node of the target node; and determine the child node of the target node according to brother index information recorded in the lower-layer node, and establish a correspondence between the target node and the child node of the target node.

Further, the index information further includes home information, and the home information is used to describe a tree to which a node belongs; and the processor 81 is further configured to:

find, according to home information of each node in a target tree when each node is the target node, a home node that belongs to the target tree; and recover an intermediate node and a data node that are of the target tree according to the found home node.

According to the metadata recovery apparatus provided in this embodiment of the present disclosure, home information can be added to a node structure, so as to identify a tree to which a node belongs. When all intermediate nodes in a target tree have been damaged, all home nodes that belong to the target tree are found, and then the target tree is recovered based on the found home nodes, ensuring that recovery can still be performed when all the intermediate nodes are damaged, and further improving data reliability.

Further, the processor 81 is further configured to add index information to each node when each node is generated.

According to the metadata recovery apparatus provided in this embodiment of the present disclosure, backup is not required, and index information is added to a node when the node is generated. Therefore, a problem in the prior art that a secondary file is different from a primary file can be overcome, and recovered data is the same as original data, improving data recovery efficiency.

Figure 17:
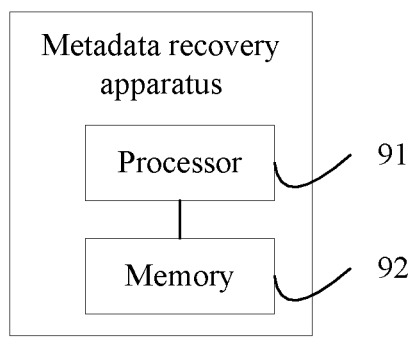
FIG. 17 is a schematic structural diagram 7 of a metadata recovery apparatus according to an embodiment of the present disclosure.

An embodiment of the present disclosure further provides a metadata recovery apparatus. As shown in FIG. 17, the apparatus includes:

a processor 91, configured to: search for a target node in nodes stored by a memory 92, where the target node has been damaged or index information recorded in the target node has been lost; and recover the index information in the target node according to index information recorded in an array corresponding to a layer at which a related node is located, where the related node includes a parent node and a child node that are of the target node and an adjacent node belonging to a same layer as the node, and the array is used to record adjacency of nodes at one layer in sequence.

The processor is further configured to: create an array for a node at each layer in the memory 92, where each array is used to record adjacency of nodes at one layer in sequence.

According to the metadata recovery apparatus provided in this embodiment of the present disclosure, a location relationship of nodes located at a same layer can be recorded by using an array form. Compared with determining a brother node of a target node by using a pointer, the brother node of the target node can be directly determined herein by using a sequence number, thereby increasing a metadata recovery speed.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A metadata recovery method, comprising:
searching, by a processor, for a target node in a storage device configured to store information related to nodes, wherein the target node has been damage; and
recovering, by the processor, the index information recorded in the target node according to index information of related nodes of the target node, wherein the related nodes comprise a parent node and a child node that are of the target node and an adjacent node belonging to a same layer as the target node, wherein the index information of the related nodes comprises brother index information pointing to the adjacent node belonging to the same layer as the target node, parent index information pointing to the parent node of the target node, and child index information pointing to the child node of the target node, wherein the recovering the index information recorded in the target node comprises:
generating a temporary node, wherein the temporary node is blank, and wherein the temporary node is configured to replace the target node;
establishing a correspondence between the temporary node and the parent node of the target node according to child index information of the parent node that points to the target node and that is recorded in the parent node;
establishing, according to other child index information recorded in the parent node of the target node, a correspondence between the temporary node and an adjacent brother node belonging to a same layer as the temporary node, wherein the other child index information is child index information in the parent node except the child index information pointing to the target node;
searching for a lower-layer node of the target node, wherein the lower-layer node is an adjacent brother node belonging to a same layer as the child node of the target node;
determining the child node of the target node according to brother index information recorded in the lower-layer node, and establishing a correspondence between the temporary node and the child node of the target node; and
replacing the target node with the temporary node.

2. The metadata recovery method according to claim 1, further comprising:
adding, by the processor, index information to each node when each node is generated.

3. A metadata recovery system, comprising:
a storage device configured to store nodes; and
a processor configured to:
search for a target node in the nodes stored by the storage device, wherein the index information recorded in the target node has been lost; and
recover, according to index information of related nodes of the target node, the index information recorded in the target node, wherein the related nodes comprise a parent node and a child node that are of the target node and an adjacent node belonging to a same layer as the target node, wherein the index information of the related nodes comprises brother index information pointing to the adjacent node belonging to the same layer as the target node, parent index information pointing to the parent node of the target node, and child index information pointing to the child node of the target node, wherein recovering the index information recorded in the target node comprises:
establishing a correspondence between the target node and the parent node of the target node according to child index information of the parent node that points to the target node and that is recorded in the parent node;
establishing, according to other child index information recorded in the parent node of the target node, a correspondence between the target node and an adjacent brother node belonging to the same layer as the target node, wherein the other child index information is child index information in the parent node except the child index information pointing to the target node;
searching for a lower-layer node of the target node, wherein the lower-layer node is an adjacent brother node belonging to a same layer as the child node of the target node; and
determining the child node of the target node according to brother index information recorded in the lower-layer node, and establish a correspondence between the target node and the child node of the target node.

4. The metadata recovery system according to claim 3, wherein the processor is further configured to:
add index information to each node when each node is generated.

5. A metadata recovery apparatus, comprising:
a processor, configured to:
search for a target node in nodes stored by a memory, wherein the target node has been damaged or index information recorded in the target node has been lost; and
recover the index information recorded in the target node according to index information of related nodes stored by the memory, wherein the related nodes comprise a parent node and a child node that are of the target node and an adjacent node belonging to a same layer as the target node, wherein the index information of the related nodes comprises brother index information pointing to the adjacent node belonging to the same layer as the target node, parent index information pointing to the parent node of the target node, and child index information pointing to the child node of the target node,
wherein if the target node has been damaged, recovering the index information recorded in the target node comprises:
generating a temporary node, wherein the temporary node is blank, and wherein the temporary node is configured to replace the target node;
establishing a correspondence between the temporary node and the parent node of the target node according to child index information of the parent node that points to the target node and that is recorded in the parent node;
establishing, according to other child index information recorded in the parent node of the target node, a correspondence between the temporary node and an adjacent brother node belonging to a same layer as the temporary node, wherein the other child index information is child index information in the parent node except the child index information pointing to the target node;
searching for a lower-layer node of the target node, wherein the lower-layer node is an adjacent brother node belonging to a same layer as the child node of the target node;
determining the child node of the target node according to brother index information recorded in the lower-layer node, and establish a correspondence between the temporary node and the child node of the target node; and
replacing the target node with the temporary node; and
wherein if the index information recorded in the target node has been lost, recovering the index information recorded in the target node comprises:
establishing a correspondence between the target node and the parent node of the target node according to child index information of the parent node that points to the target node and that is recorded in the parent node;
establishing, according to other child index information recorded in the parent node of the target node, a correspondence between the target node and an adjacent brother node belonging to the same layer as the target node, wherein the other child index information is child index information in the parent node except the child index information pointing to the target node;
searching for a lower-layer node of the target node, wherein the lower-layer node is an adjacent brother node belonging to a same layer as the child node of the target node; and
determining the child node of the target node according to brother index information recorded in the lower-layer node, and establish a correspondence between the target node and the child node of the target node.

6. The metadata recovery apparatus according to claim 5, wherein the processor is further configured to add index information to each node when each node is generated.

* * * * *

UNITED STATES PATENT AND TRADEMARK OFFICE
CERTIFICATE OF CORRECTION

PATENT NO. : 10,423,501 B2
APPLICATION NO. : 15/605501
DATED : September 24, 2019
INVENTOR(S) : Zhou et al.

It is certified that error appears in the above-identified patent and that said Letters Patent is hereby corrected as shown below:

In the Claims

Claim 1, Column 24, Line 27: "damage" should read -- damaged --.

Signed and Sealed this
Third Day of March, 2020

Andrei Iancu
*Director of the United States Patent and Trademark Office*